(12) United States Patent
Arita (10) Patent No.: US 11,384,840 B2
(45) Date of Patent: Jul. 12, 2022

(54) SEAL DEVICE

(71) Applicant: EAGLE INDUSTRY CO., LTD., Tokyo (JP)

(72) Inventor: Yasuhisa Arita, Tokyo (JP)

(73) Assignee: EAGLE INDUSTRY CO., LTD.

( * ) Notice: Subject to any disclaimer, the term of this patent is extended or adjusted under 35 U.S.C. 154(b) by 51 days.

(21) Appl. No.: 16/975,688

(22) PCT Filed: Mar. 13, 2019

(86) PCT No.: PCT/JP2019/010145
§ 371 (c)(1),
(2) Date: Aug. 25, 2020

(87) PCT Pub. No.: WO2019/176976
PCT Pub. Date: Sep. 19, 2019

(65) Prior Publication Data
US 2020/0400235 A1    Dec. 24, 2020

(30) Foreign Application Priority Data
Mar. 15, 2018  (JP) .............................. JP2018-048435

(51) Int. Cl.
*F16J 15/3232* (2016.01)
*F16J 15/3252* (2016.01)
*F16J 15/3268* (2016.01)

(52) U.S. Cl.
CPC ....... *F16J 15/3232* (2013.01); *F16J 15/3252* (2013.01); *F16J 15/3268* (2013.01)

(58) Field of Classification Search
CPC .................. F16J 15/00; F16J 15/32; F16J 15/3204; F16J 15/3232; F16J 15/3236;
(Continued)

(56) References Cited

U.S. PATENT DOCUMENTS 3,467,395 A    9/1969  Yoshiro .......................... 277/37
3,741,615 A    6/1973  Otto ........................... 308/187.1
(Continued)

FOREIGN PATENT DOCUMENTS

| CN | 104040228 | 9/2014 | ............... F16J 15/16 |
| DE | 10 2016 217 069 | 3/2018 | .............. F16C 33/78 |

(Continued)

OTHER PUBLICATIONS

Extended European Search Report issued in EPO Patent Appln. Serial No. 19767477.3-1015, dated Dec. 20, 2021, 12 pages.
(Continued)

*Primary Examiner* — Nathan Cumar
(74) *Attorney, Agent, or Firm* — Hayes Soloway P.C.

(57) ABSTRACT

A seal device for sealing a space between a housing and a rotating shaft includes seal members, and a holder having a cylindrical portion and configured to retain the seal members the cylindrical portion being press-fitted into a shaft hole provided in the housing. The holder is provided with, at one end of the cylindrical portion, a protruding portion protruded in a radially outward direction of the cylindrical portion. The shaft hole of the housing has a tapered portion having an annular shape and forming one end portion of the shaft hole to guide an insertion of the holder into the shaft hole. The protruding portion is provided on an inner diameter side of the tapered portion.

15 Claims, 7 Drawing Sheets

(58) Field of Classification Search
CPC .. F16J 15/3248; F16J 15/3252; F16J 15/3268; F16J 15/3272; F16J 15/3276
USPC ........................................................ 277/565
See application file for complete search history.

(56) References Cited

U.S. PATENT DOCUMENTS

| | | | | |
|---|---|---|---|---|
| 8,256,772 | B2* | 9/2012 | Itadani | F16J 15/322 |
| | | | | 277/353 |
| 9,194,498 | B2* | 11/2015 | Yoshino | F16J 15/32 |
| 2013/0228978 | A1* | 9/2013 | Nakazono | F16J 15/3244 |
| | | | | 277/562 |
| 2014/0377057 | A1 | 12/2014 | Oiyama | F01D 25/183 |
| 2015/0192205 | A1 | 7/2015 | Oiyama et al. | F16J 15/002 |
| 2015/0267817 | A1* | 9/2015 | Fujii | F16J 15/3228 |
| | | | | 277/572 |
| 2016/0258535 | A1 | 9/2016 | Jurrell et al. | F16J 15/3232 |

FOREIGN PATENT DOCUMENTS

| | | | |
|---|---|---|---|
| FR | 1477198 | 4/1967 | |
| JP | 63-312570 | 12/1988 | ............... F16J 15/32 |
| JP | 2006-300186 | 11/2006 | ............... F16J 15/32 |
| JP | 4545468 | 9/2010 | ............... F16J 15/32 |
| JP | 2015-183750 | 10/2015 | ............... F16J 15/32 |
| JP | 2017-223253 | 12/2017 | ............... F16C 33/78 |

OTHER PUBLICATIONS

International Preliminary Report on Patentability issued in PCT/JP2019/010145, dated Sep. 15, 2020, 6 pages.

Chinese Official Action issued in related Chinese Patent Application Serial No. 201980015696.6, dated Dec. 14, 2021 with English translation, 15 pages.

International Search Report (w/ English translation) and Written Opinion issued in PCT/JP2019/010145, dated Jun. 18, 2019, 6 pages.

* cited by examiner

SEAL DEVICE

TECHNICAL FIELD

The present invention relates to a seal device that seals a rotating shaft.

BACKGROUND ART

In the related art, as a seal device that prevents a fluid, which is sealed inside a housing of a water pump or the like, from leaking to an atmosphere side, for example, there is known a lip seal device that seals a space between a housing and a rotating shaft.

For example, a lip seal device disclosed in Patent Citation 1 includes a seal lip which is in sliding contact with a rotating shaft, and a retaining ring with a flange which has a cylindrical shape and retains the seal lip. The retaining ring and the seal lip are unitized, so that the assembly of the unit to a housing is simplified. The retaining ring is press-fitted into a shaft hole of the housing from a sealed fluid side, and the flange extending in an outer diameter direction is in contact with an end surface of the housing, so that the position of the retaining ring in an axial direction is determined. A tapered portion extending from a sealed fluid side end surface of the housing toward the shaft hole is formed in the housing to guide the press-fit of the retaining ring. In addition, in an installation state, since the seal lip is in a state of contact with the rotating shaft in a circumferential direction, it is possible to seal a space between the housing and the rotating shaft. In addition, even when a fitting force between the housing and the retaining ring decreases due to aging, since the flange of the retaining ring is in contact with the end surface of the housing, the seal device does not move toward the atmosphere side.

On the other hand, the trend of equipment such as a pump is toward the reduction of size, and it may be required to reduce the inner diameter of the shaft hole of the housing or a space accommodating a sealed fluid. In this case, an end portion of the retaining ring is bent toward an inner diameter side to form a flange in the inner diameter side, and thus the strength of the retaining ring is increased while the outer diameter of the retaining ring is kept small.

CITATION LIST

Patent Literature

Patent Citation 1: JP 2006-300186 A (pages 5 to 7 and FIG. 2)

SUMMARY OF INVENTION

Technical Problem

However, in the former lip seal device disclosed in Patent Citation 1, the assembly of the seal device to the housing is simple owing to the retaining ring and the seal device does not move toward the atmosphere side even when the sealed fluid becomes a high pressure; however, since the flange extending in the outer diameter direction of the retaining ring is formed, the seal device cannot be used in a housing having a small inner diameter.

In addition, since the latter lip seal device can be assembled to a housing having a small inner diameter but has a structure where the retaining ring is fixed to a shaft hole of the housing by press-fit, under a condition where the operating hour, the sealed pressure, the temperature, and the like are severe, a deformation occurs in the housing and a fitting force between the housing and the retaining ring becomes weak, so that the seal device is pulled out from the shaft hole; and thereby, it is not possible to maintain the sealing performance, which is a problem.

The present invention is made in light of such problems, and an object of the present invention is to provide a seal device that is excellent in sealing performance without an excessive movement.

Solution to Problem

According to the present invention, there is provided a seal device for sealing a space between a housing and a rotating shaft, includes: a seal member; and a holder having a cylindrical portion and configured to retain the seal member, the cylindrical portion of the holder being press-fitted into a shaft hole provided in a housing, wherein the holder is provided with, at one end of the cylindrical portion, a protruding portion protruded in a radially outward direction of the cylindrical portion, wherein the shaft hole of the housing has a tapered portion having an annular shape and forming one end portion of the shaft hole to guide an insertion of the holder into the shaft hole, and wherein the protruding portion is provided on an inner diameter side of the tapered portion, i.e., an outer diameter of the protruding portion is smaller than a largest inner diameter of the tapered portion. According to the aforesaid feature of the present invention, when a fitting force between the shaft hole of the housing and the cylindrical portion of the holder becomes weak and the seal device moves toward an atmosphere side, the protruding portion of the holder comes into contact with the tapered portion of shaft hole to receive a radial force. Therefore, guiding is performed in a state where an axis of the holder coincides with an axis of the shaft hole, and in a state where the protruding portion is substantially uniformly pressed toward a radially inward direction of the tapered portion to be in uniform contact with the tapered portion in a circumferential direction, the seal device is pushed in, so that the movement of the seal device is regulated. Accordingly, only a slight movement of the seal device in an axial direction is allowed; and thereby, it is possible to maintain the sealing between the housing and the rotating shaft.

Preferably, the protruding portion may be spaced apart from an inner surface of the tapered portion in an axial direction in a state where the seal device is assembled to the housing. According to this preferable configuration, until the protruding portion and the inner surface of the tapered portion come into contact with each other, no load occurs in the tapered portion, and a creep deformation is unlikely to occur in the tapered portion.

Preferably, an end surface of the protruding portion and an end surface of the cylindrical portion of the holder in a radial direction may coincide with each other. According to this preferable configuration, the protruding portion has a high rigidity in the axial direction.

Preferably, a protrusion dimension of the protruding portion from the cylindrical portion of the holder may be smaller than a thickness of the cylindrical portion. According to this preferable configuration, it is possible to assemble the seal device into the housing having a small inner diameter.

Preferably, an end portion of the protruding portion, which faces the tapered portion, may has a surface extending from the cylindrical portion of the holder substantially in a vertical direction. According to this preferable configuration, the protruding portion easily bites into the tapered portion; and thereby, it is possible to reduce an excessive positional deviation of the seal device in the axial direction.

Preferably, an inclination angle of the tapered portion with respect to the shaft hole may be 45 degrees or less. According to this configuration, when the protruding portion comes into contact with the tapered portion, the tapered portion acts like a wedge, so that the protruding portion is unlikely to be pulled out from the tapered portion; and thereby, it is possible to prevent the positional deviation of the seal device in the axial direction.

DESCRIPTION OF EMBODIMENTS

Hereinafter, a mode for implementing a seal device according to the present invention will be described based on an embodiment.

Embodiment

A seal device according to an embodiment will be described with reference to FIGS. 1 to 7.

Figure 1:
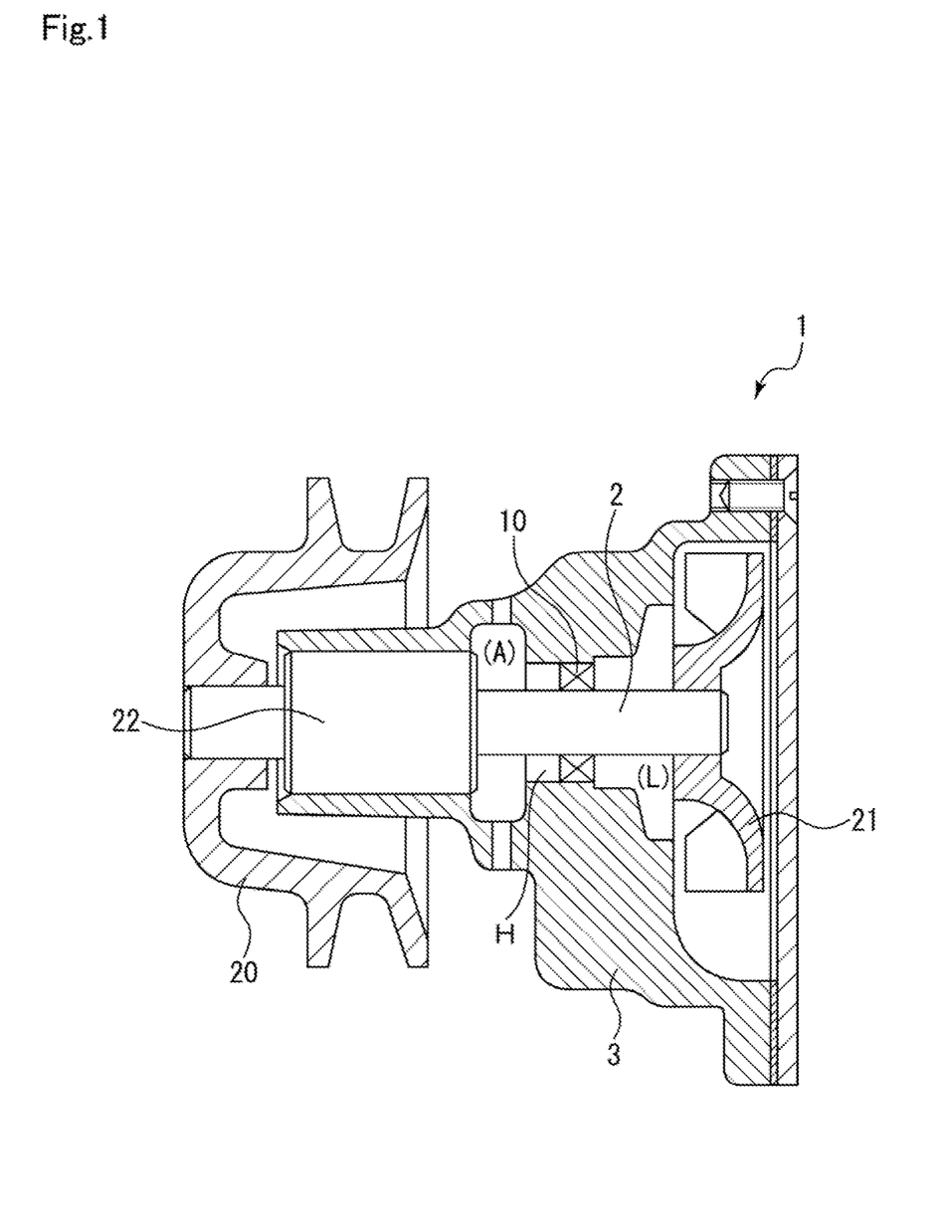
FIG. 1 is a schematic sectional view of a water pump using a seal device according to an embodiment of the present invention.

As illustrated in FIG. 1, a seal device 10 of the present embodiment is a lip seal device, and is used in a water pump 1, which pressure-feeds cooling water (so-called LLC) that cools an engine of an automobile, to prevent the cooling water inside a housing 3 from leaking outside. The water pump 1 is configured such that an impeller 21 mounted on the other side end portion of a rotating shaft 2 is rotated to deliver the cooling water from a discharge port by the rotation of a pulley 20 mounted on one side end portion of the rotating shaft 2. A bearing 22 is mounted on a substantially central portion of the rotating shaft 2. In addition, the seal device 10 is mounted in a shaft hole H and partitions an interior of the housing 3 into a sealed fluid side L and an atmosphere side A to seal a space between the rotating shaft 2 and the housing 3. Incidentally, the seal device 10 according to the present invention may be applied to other fluids or applications.

Figure 2:
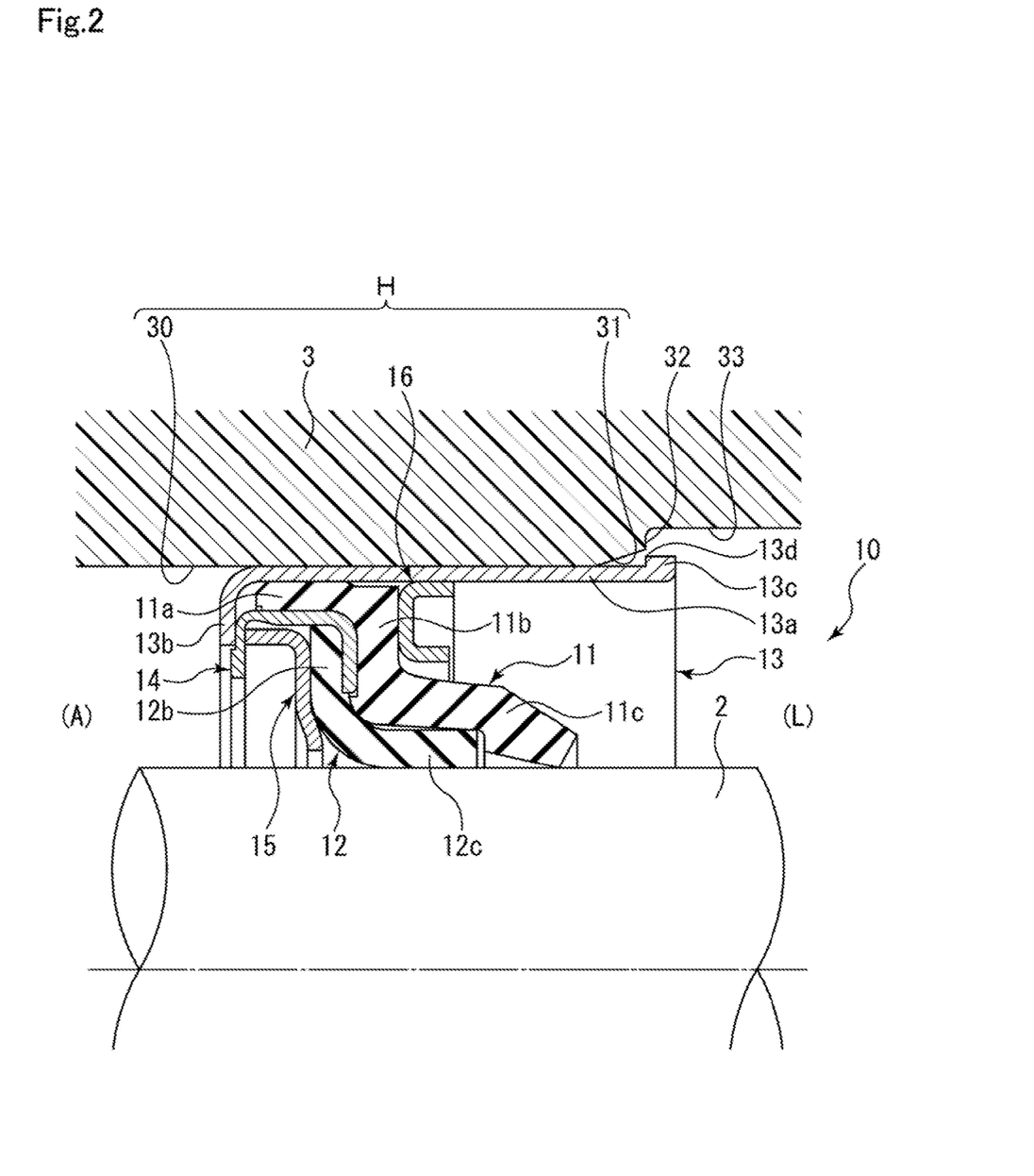
FIG. 2 is a side sectional view illustrating the seal device according to the embodiment of the present invention which is mounted on a rotating shaft.

Subsequently, the seal device 10 will be described. As illustrated in FIG. 2, the seal device 10 is unitized by assembling a first seal lip 11 as a seal member made of a rubber material, for example, H-NBR and a second seal lip 12 made of a resin material, for example, PTFE with an inside case 14, a backup ring 15, and an adapter 16 on an inner diameter side of a holder 13 formed into a cylindrical shape.

Figure 3:
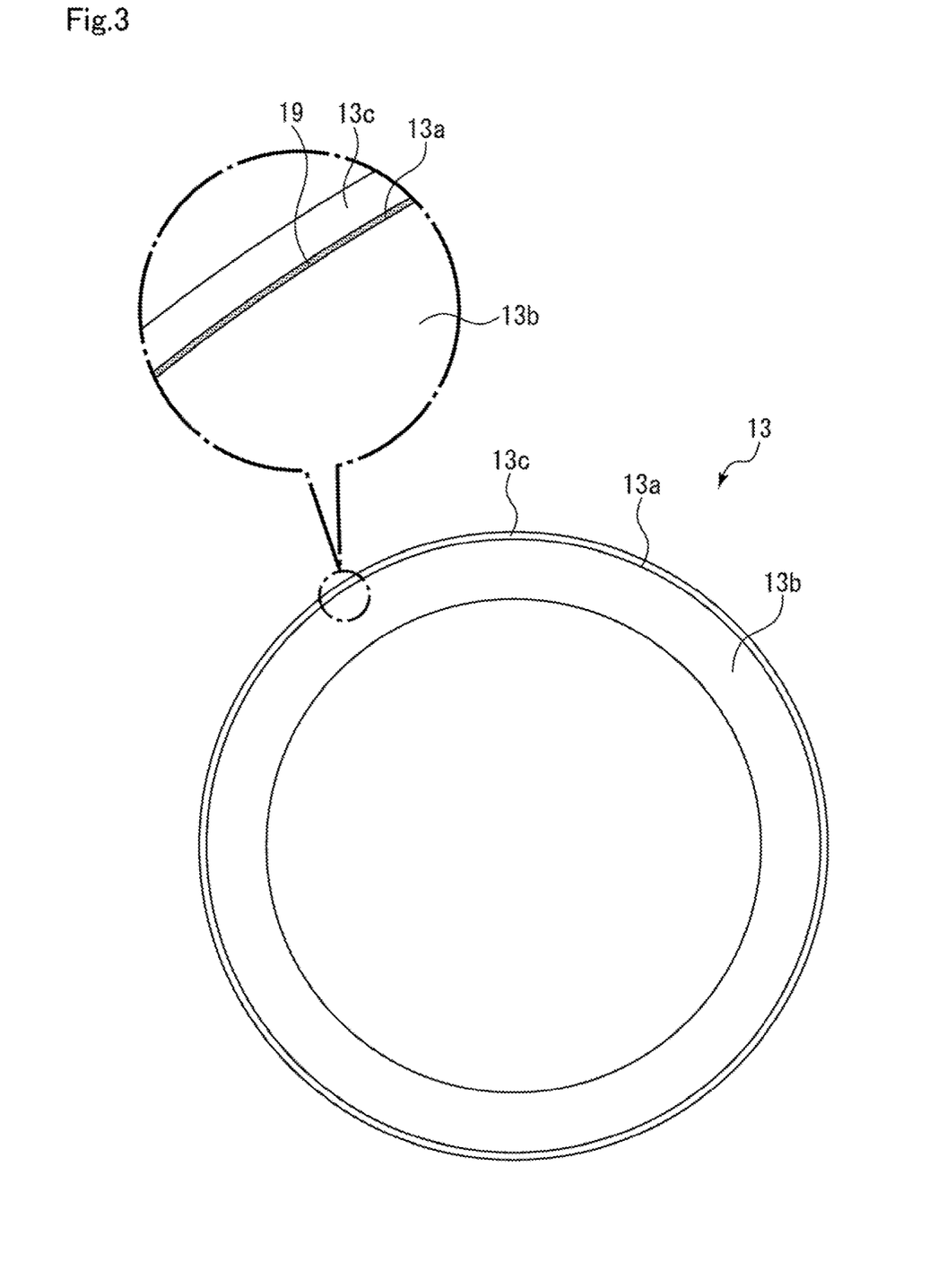
FIG. 3 is a front view of a holder as seen from an atmosphere side in the embodiment.

As illustrated in FIGS. 2 and 3, a stainless steel is extruded and then pressed to form the holder 13, and the holder 13 includes a cylindrical portion 13a which has a plate shape and extends along an axis of the holder 13, a bottom plate portion 13b which has an annular shape and is bent from an atmosphere side A end portion of the cylindrical portion 13a toward the inner diameter side of the holder 13 substantially in a vertical direction to protrude linearly, and a protruding portion 13c which protrudes linearly from a sealed fluid side L end portion of the cylindrical portion 13a toward an outer diameter side thereof substantially in the vertical direction, to form a crank shape in a sectional view.

In addition, the holder 13 has substantially the same dimension where the outer diameter of the cylindrical portion 13a is slightly larger than the inner diameter of the shaft hole H. In addition, as illustrated in a callout of FIG. 3, a latex 19 is applied to an outer peripheral surface of the holder 13.

Figure 4:
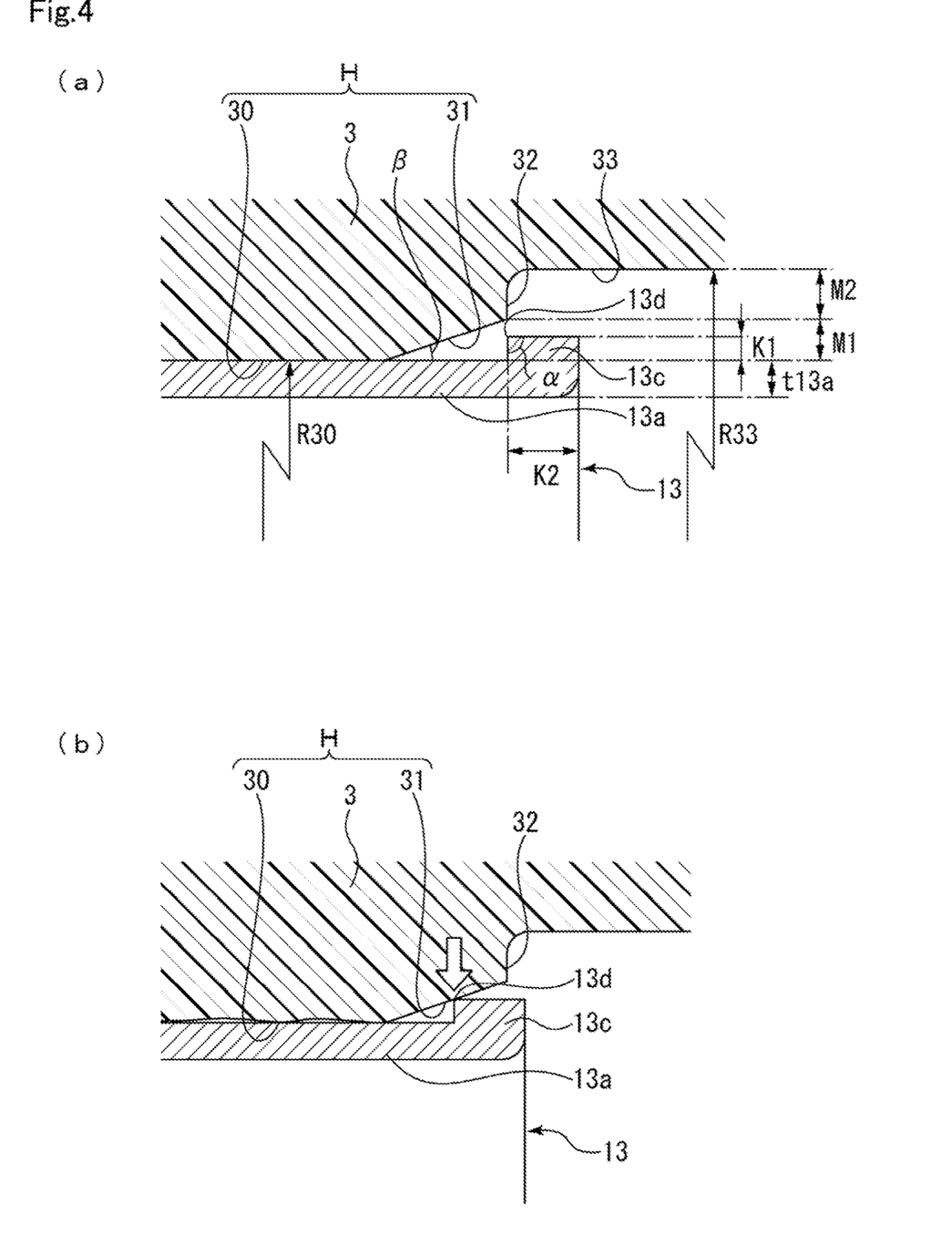
FIG. 4A is a side sectional view illustrating a normal installation state of the seal device in the embodiment.
FIG. 4B is a side sectional view illustrating a state where the seal device has moved to the atmosphere side in the embodiment.
Figure 5:
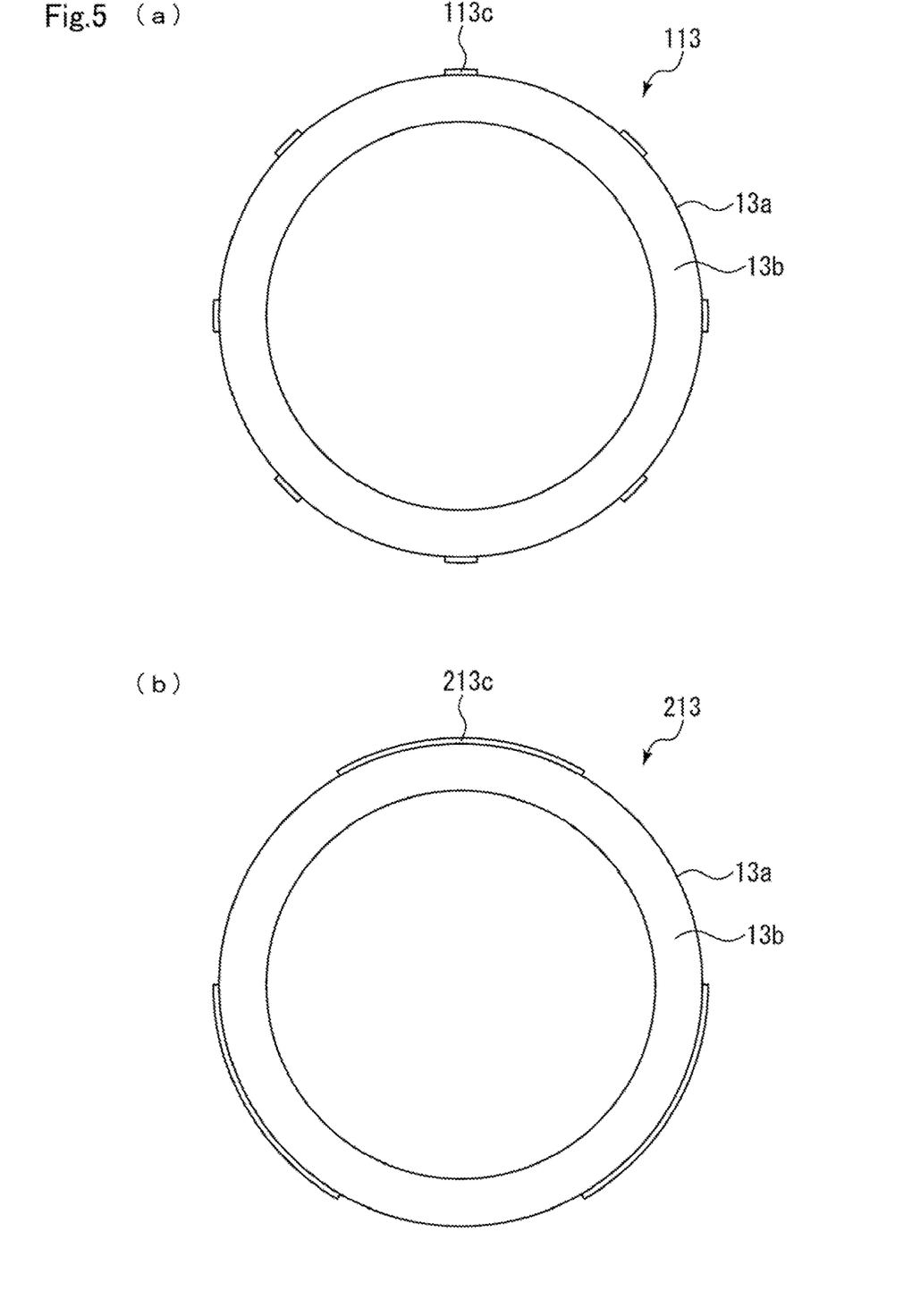
FIGS. 5A and 5B are front views illustrating modification examples of the holder as seen from the atmosphere side in the embodiment.
Figure 6:
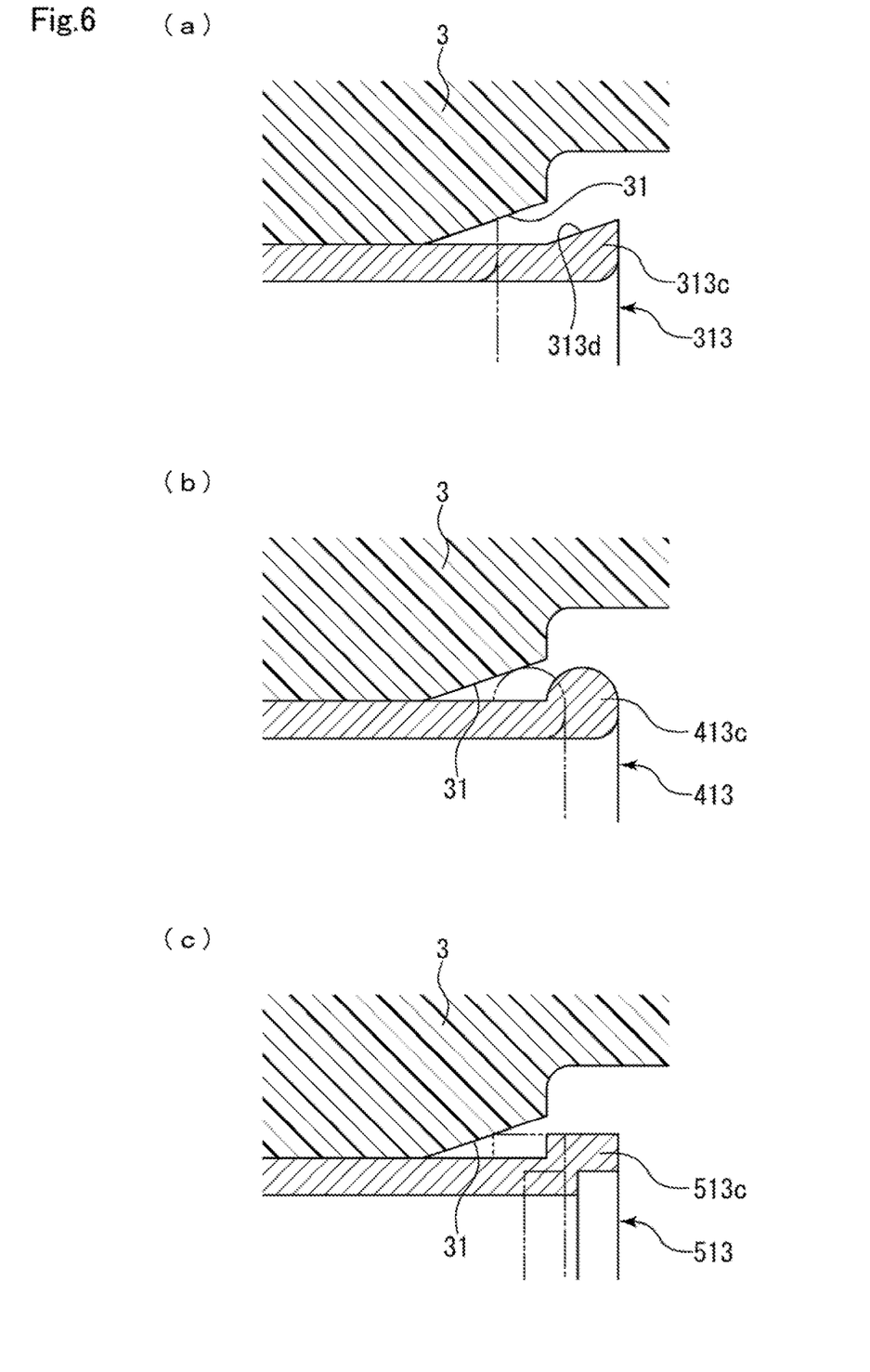
FIGS. 6A to 6C are side sectional views illustrating modification examples of a protruding portion in the embodiment.
Figure 7:
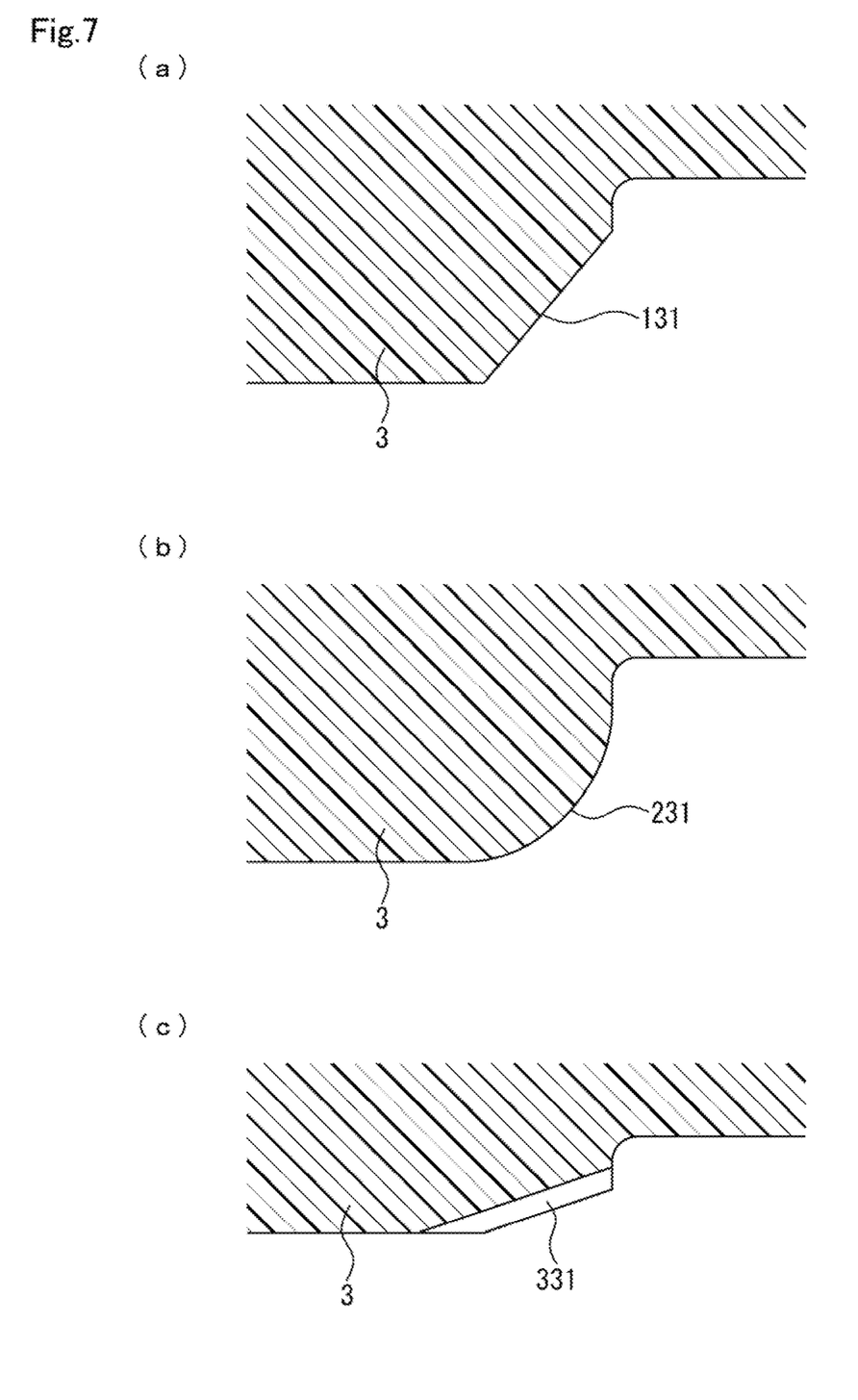
FIGS. 7A-7C are side sectional views illustrating modification examples of a tapered portion in the embodiment.

As illustrated in FIGS. 2 to 4, the protruding portion 13c is formed on an outer peripheral surface of the sealed fluid side L end portion of the holder 13 without interruption in a circumferential direction (refer to FIG. 3). A protrusion dimension K1 of the protruding portion 13c from the cylindrical portion 13a is smaller than a thickness t13a of the cylindrical portion 13a (i.e., K1<t13a), and a dimension K2 of the protruding portion 13c in an axial direction is larger than the thickness t13a of the cylindrical portion 13a (i.e., K2>t13a) (refer to FIG. 4A). Accordingly, the protruding portion 13c has a high rigidity in the axial direction, so that the seal device 10 can be assembled to the housing 3 having a small diameter on the sealed fluid side L. In addition, an angle α of a corner 13d of the protruding portion 13c, which faces a tapered surface 31 of the housing 3 to be described later, is substantially 90 degrees. In addition, a sealed fluid side L end surface of the protruding portion 13c is aligned with a sealed fluid side L end surface of the cylindrical portion 13a of the holder 13 in a radial direction, so that the thickness of the holder 13 within the formation range of the protruding portion 13c becomes thick, and thus the rigidity of the holder 13 is high. Furthermore, since the protruding portion 13c is formed by forging, the rigidity of the protruding portion 13c is high. In addition, the protruding portion 13c is more easily formed, for example, compared to when a protruding portion having the same shape is formed by cutting. In addition, it is preferable that the protruding portion 13c is harder than the housing 3.

As illustrated in FIG. 2, the inside case 14 is formed into a cylindrical shape from a stainless steel, and has a downward U-shape in a sectional view. Similarly, the backup ring 15 is formed into a downward L-shaped cylindrical shape in a sectional view, and the adapter 16 is formed into a rightward U-shaped cylindrical shape in a sectional view.

As illustrated in FIG. 2, the first seal lip 11 is formed into a cylindrical shape, and includes an outer peripheral portion 11a extending along an axis of the first seal lip 11, an extension portion 11b extending from a sealed fluid side L end portion of the outer peripheral portion 11a toward an inner diameter side of the first seal lip 11 substantially in the vertical direction, and an inner peripheral portion 11c extending obliquely downward from an inner diameter side end portion of the extension portion 11b toward the sealed fluid side L, to form a crank shape in a sectional view.

As illustrated in FIG. 2, the second seal lip 12 is formed into a cylindrical shape, and includes an extension portion 12b extending substantially in the vertical direction with respect to an axis of the second seal lip 12 and an inner peripheral portion 12c which is bent from an inner diameter side end portion of the extension portion 12b toward the sealed fluid side L substantially in the vertical direction to extend along the rotating shaft 2, namely, along the axis of the second seal lip 12, to form an L-shape in a sectional view.

Subsequently, the housing 3 will be described. The housing 3 is made of a resin material by die cutting, and includes an inner peripheral surface 30 which is linear in a sectional view and communicates with a space on the atmosphere side A, the tapered surface 31 as a tapered portion which has a linear tapered shape in a sectional view and communicates with the inner peripheral surface 30 and of which the diameter increases gradually toward the sealed fluid side L, a radial end surface 32 extending from a sealed fluid side L end portion of the tapered surface 31 toward an outer diameter side of the housing 3 substantially in the vertical direction with respect to the axis of the shaft hole H, and a peripheral end surface 33 extending from an outer diameter side end portion of the radial end surface 32 toward the sealed fluid side L substantially in the vertical direction. The shaft hole H is defined by the inner peripheral surface 30 and the tapered surface 31, and the tapered surface 31 forms one end portion of the shaft hole H.

As illustrated in FIG. 4, an inclination angle $\beta$ of the tapered surface 31 with respect to the axis from the sealed fluid side L to the atmosphere side A is substantially 20 degrees. In addition, a dimension M1 of the tapered surface 31 in the radial dimension from an atmosphere side A end portion thereof to the sealed fluid side L is larger than the foregoing protrusion dimension K1 of the protruding portion 13c (i.e., M1>K1). In other words, an outer diameter of the protruding portion 13c is smaller than a largest inner diameter of the tapered surface 31. Incidentally, the inclination angle $\beta$ of the tapered surface 31 is not limited to a specific numerical number, and similarly, the following numerical values are not also limited.

As illustrated in FIGS. 2 and 4, a space on the sealed fluid side L which is adjacent to a shaft hole H side is formed in a substantially columnar space where a radius R33 to the peripheral end surface 33 is slightly larger than a radius R30 of the shaft hole H. Specifically, a dimension M2 of the radial end surface 32 from an inner diameter side to an outer diameter side thereof is substantially the same dimension as the foregoing dimension M1 of the atmosphere side A of the tapered surface 31 (i.e., M1≈M2) in the radial dimension, and the dimension M2 in the radial direction from the sealed fluid side L end portion of the tapered surface 31 to the peripheral end surface 33 is approximately 1.5 times, preferably 1 to 3 times the thickness t13a of the cylindrical portion 13a of the holder 13. Namely, the space on the sealed fluid side L is formed in a space having a small inner diameter, where there is a slight difference in radial dimension between the space and the shaft hole H or the holder 13.

Subsequently, the assembly of the seal device 10 to the housing 3 will be described. In a state where the seal device 10 is positionally aligned with the shaft hole H, when a jig (not illustrated) is engaged with the protruding portion 13c from the inner diameter side of the holder 13 and the seal device 10 is pushed in together with the jig in the axial direction, firstly, the bottom plate portion 13b is guided by the tapered surface 31, and the axis of the holder 13 smoothly approaches the axis of the shaft hole H. In addition, since an outer diameter side of the bottom plate portion 13b is bent, the bottom plate portion 13b is smoothly guided and inserted into the shaft hole H.

When the seal device 10 is further pushed toward the atmosphere side A in the shaft hole H by the jig and the cylindrical portion 13a moves along the inner peripheral surface 30 of the housing 3 to reach a predetermined position, for example, when the corner 13d of the protruding portion 13c reaches a position where the corner 13d substantially lines up with the radial end surface 32 in the radial direction (refer to FIG. 4A), the push-in is ended. Accordingly, a majority of the cylindrical portion 13a, namely, 80% or more of the cylindrical portion 13a is fitted into the shaft hole H, and the outer diameter of the cylindrical portion 13a is slightly larger than the inner diameter of the shaft hole H; and thereby, the holder 13 is prevented from being pulled out from the shaft hole H, namely, a fitting force sufficient to immovably fix the holder 13 occurs between the housing 3 and the cylindrical portion 13a. In this manner, the seal device 10 is fitted into and fixed to the housing 3, so that both can be assembled. In this case, the protruding portion 13c of the holder 13 of the seal device 10 is spaced apart from the tapered surface 31 of the housing 3 in the axial direction (refer to FIG. 2).

In addition, a gap between the holder 13 and the inner peripheral surface 30 of the housing 3 is secondarily sealed by the latex 19 applied to an outer peripheral portion of the cylindrical portion 13a (refer to FIG. 3), so that the sealing performance between the seal device 10 and the housing 3 is improved.

In addition, since the foregoing protrusion dimension K1 of the protruding portion 13c is shorter than the foregoing dimension M1 of the tapered surface 31 in the radial dimension, the seal device 10 can be assembled into the housing 3 having a small inner diameter. Incidentally, the radial end surface 32 may not be provided, so that the inner diameter of the space on the sealed fluid side L is substantially the same dimension as the inner diameter of the sealed fluid side L of the tapered surface 31.

Here, as described above, normally, the seal device 10 is immovably fixed by the fitting force occurring between the housing 3 and the cylindrical portion 13a; however, for example, there may be a case where the housing 3 is deformed due to aging, a creep deformation, an operating condition where the sealed pressure, the temperature, and the like are severe, or the like, the fitting force between the housing 3 and the seal device 10 becomes weak, and the seal device 10 moves toward the atmosphere side A due to a pressure on the sealed fluid side L.

When the fitting force between the housing 3 and the holder 13 becomes weak and the seal device 10 moves toward the atmosphere side A, as illustrated in FIG. 4B, the protruding portion 13c of the holder 13 of the seal device 10 comes into contact with the tapered surface 31, so that the movement of the holder 13 is regulated; and thereby, it is possible to prevent the seal device 10 from being pulled out toward the atmosphere side A.

In addition, when the fitting force between the housing 3 and the holder 13 becomes weak and the seal device 10 moves toward the atmosphere side A, the protruding portion 13c comes into contact with the tapered surface 31 to receive a radial force. Therefore, guiding is performed in a state where the axis of the holder 13 coincides with the axis of the shaft hole H, and in a state where the protruding portion 13c is substantially uniformly pressed toward an inner diameter direction of the tapered surface 31 to be in uniform contact with the tapered surface 31 in the circumferential direction, the seal device 10 is pushed in, so that the movement of the seal device 10 is regulated. Accordingly, only a slight movement of the seal device 10 in the axial direction is allowed; and thereby, it is possible to maintain the sealing between the housing 3 and the rotating shaft 2.

In addition, since the housing 3 and the seal device 10 are assembled in a state where the tapered surface 31 is spaced apart from the protruding portion 13*c* of the holder 13 in the axial direction, until the protruding portion 13*c* and the tapered surface 31 come into contact with each other, no load occurs in the tapered surface 31 and a creep deformation is unlikely to occur in the tapered surface 31. The seal device 10 moves and the protruding portion 13*c* of the holder 13 comes into contact with the tapered surface 31 to easily bite into the tapered surface 31, so that an excessive movement of the seal device 10 can be reliably prevented; and thereby, it is possible to maintain the sealing performance.

In addition, since the protruding portion 13*c* of the holder 13 linearly protrudes from the cylindrical portion 13*a* of the holder 13 toward the outer diameter side substantially in the vertical direction and the angle of the corner 13*d* of the protruding portion 13*c* is substantially 90 degrees, the protruding portion 13*c* easily bites into the tapered surface 31; and thereby, it is possible to reduce an excessive positional deviation of the seal device 10 in the axial direction.

In addition, the further the seal device 10 moves toward the atmosphere side A to cause the protruding portion 13*c* of the holder 13 to bite into the tapered surface 31, the larger the contact area of the tapered surface 31 with respect to the radial end surface of the protruding portion 13*c* of the holder 13 becomes; and thereby, it is possible to increase a force to regulate the movement of the seal device 10.

In addition, since the inclination angle β of the tapered surface 31 is substantially 20 degrees, namely, is 45 degrees or less, when the protruding portion 13*c* of the holder 13 comes into contact with the tapered surface 31, the tapered surface 31 acts like a wedge, so that the protruding portion 13*c* is unlikely to be pulled out from the tapered surface 31; and thereby, it is possible to prevent the positional deviation of the seal device 10 in the axial direction.

In addition, since the inclination angle β of the tapered surface 31 is substantially 20 degrees, the dimension from a portion of the tapered surface 31 with which the protruding portion 13*c* of the holder 13 initially comes into contact to a position where the shaft hole H is reached is large, and thus an allowance of movement to the position where the shaft hole H is reached is large. Therefore, the protruding portion 13*c* is unlikely to be pulled out from the tapered surface 31.

In addition, the cylindrical portion 13*a* of the holder 13 comes into contact with the housing 3 in the circumferential direction, to position the holder 13, and the positioning portion is present only along the circumferential direction; and thereby, it is easy to improve the positioning accuracy.

Subsequently, modification examples of the holder will be described. The mode where the protruding portion 13*c* of the holder 13 is formed without interruption in the circumferential direction has been described; however, as illustrated in FIGS. 5A and 5B, a mode where protruding portions 113*c* and 213*c* which are short in the circumferential direction are formed in holders 113 and 213 at eight equal intervals and three equal intervals in the circumferential direction may be adopted.

In addition, the mode where the protruding portion 13*c* linearly protrudes from the cylindrical portion 13*a* of the holder 13 toward the outer diameter side substantially in the vertical direction and the angle α of the corner 13*d* of the protruding portion 13*c* is substantially 90 degrees has been described; however, as illustrated in FIG. 6A, a protruding portion 313*c* may include a tapered surface 313*d* which has an inclination angle of substantially 20 degrees and protrudes toward an outer diameter side from the atmosphere side A toward the sealed fluid side L. In this mode, since the inclination angle of the tapered surface 31 and the inclination angle of the tapered surface 313*d* are substantially the same, when a holder 313 moves toward the atmosphere side A, the tapered surface 313*d* comes into surface contact with the tapered surface 31, so that a pressing force which is applied to the protruding portion 313*c* from the tapered surface 31 can be substantially equally dispersed; and thereby, the guide accuracy is high and the position regulating function is very accurate.

In addition, as illustrated in FIG. 6B, a mode where a protruding portion 413*c* protrudes in a hemispherical shape in a sectional view toward an outer diameter side of a holder 413 may be adopted. In this mode, a deformation of the protruding portion 413*c* due to coming into contact with the tapered surface 31 is unlikely to occur.

In addition, as illustrated in FIG. 6C, a mode where a sealed fluid side L end portion of a holder 513 includes a protruding portion 513*c* which linearly protrudes from a cylindrical portion of the holder 513 toward an outer diameter side of the holder 513 substantially in the vertical direction and a recessed portion which is recessed on an inner diameter side of the cylindrical portion from a sealed fluid side L end surface of the holder 513 to a substantially axial central portion of the protruding portion 513*c*, to form a step shape in a sectional view may be adopted. In this mode, the weight of the holder 513 is reduced and the production thereof is simple.

Subsequently, modification examples of the tapered portion will be described. The mode where the inclination angle β of the tapered surface 31 from the atmosphere side A to the sealed fluid side L is substantially 20 degrees has been described; however, as illustrated in FIG. 7A, a mode where the inclination angle of a tapered surface 131 as a tapered portion from the atmosphere side A to the sealed fluid side L is substantially 50 degrees, namely, is 45 degrees or greater may be adopted.

In addition, the mode where the tapered surface 31 has a linear tapered shape in a sectional view has been described; however, as illustrated in FIG. 7B, a mode where a tapered surface 231 as a tapered portion is formed into a protrusion-curved tapered shape in a sectional view may be adopted. In this mode, since the inner diameter of a substantially central portion from a sealed fluid side L end portion to an atmosphere side A end portion decreases rapidly, the accuracy of guiding the holder 13 is high and the position regulating function for the holder 13 is very accurate.

In addition, the mode where the tapered surface 31 is continuous in the circumferential direction has been described; however, as illustrated in FIG. 7C, a mode where tapered surfaces 331 as tapered portions protruding discontinuously in the circumferential direction are formed at predetermined intervals, such as eight equal intervals or three equal intervals may be adopted.

The embodiment of the present invention has been described above with reference to the drawings; however, the specific configuration is not limited to the embodiment, and changes or additions which are made without departing from the concept of the present invention can be included in the present invention.

For example, in the foregoing embodiment, a lip seal device has been described as a mode of the seal device 10;

however, the present invention is not limited thereto, and the seal device 10 may be another type of seal device such as a labyrinth seal device or a gland packing seal device.

In addition, the mode where the seal device 10 is assembled to the housing 3 having a small inner diameter on the sealed fluid side L has been described; however, the present invention is not limited thereto, and the seal device 10 may be assembled to a housing having a large inner diameter on the sealed fluid side L. In addition, the mode where the housing is made of a resin has been described; however, the present invention is not limited thereto, and the housing may be made of metal such as a stainless steel or an aluminum-steel alloy.

In addition, the mode where when the seal device 10 is assembled to the housing 3, the protruding portion 13c of the holder 13 is spaced apart from the tapered surface 31 of the housing 3 in the axial direction has been described; however, the present invention is not limited thereto, and a mode where when the seal device 10 is assembled to the housing 3, the tapered surface 31 and the protruding portion 13c of the holder 13 are in contact with each other may be adopted.

REFERENCE SIGNS LIST

2 Rotating shaft
3 Housing
Seal device
11 First seal lip (seal member)
12 Second seal lip (seal member)
13 Holder
13a Cylindrical portion
13c Protruding portion
31 Tapered surface (tapered portion)
113 Holder
113c Protruding portion
131 Tapered surface (tapered portion)
213 Holder
213c Protruding portion
231 Tapered surface (tapered portion)
313 Holder
313c Protruding portion
331 Tapered surface (tapered portion)
413 Holder
413c Protruding portion
513 Holder
513c Protruding portion
A Atmosphere side
H Shaft hole
K1 Protrusion dimension
K2 Dimension
L Sealed fluid side
M1 Dimension
M2 Dimension
R30 Radius
R33 Radius
t13a Thickness
α Angle
β Inclination angle

The invention claimed is:

1. A seal device for sealing a space between a housing and a rotating shaft, comprising:
a seal member; and
a holder having a cylindrical portion and configured to retain the seal member, the cylindrical portion of the holder being press-fitted into a shaft hole provided in a housing,
wherein the holder is provided with, at one axial end of the cylindrical portion toward a sealed fluid side, a protruding portion protruded in a radially outward direction of the cylindrical portion,
the shaft hole of the housing has a tapered portion having an annular shape and forming one end portion of the shaft hole to guide an insertion of the holder into the shaft hole, and
the protruding portion is positioned on an inner diameter side of the tapered portion and spaced apart from an inner surface of the tapered portion in an axial direction toward the sealed fluid side in a state where an assembling of the holder into the housing is completed,
wherein an outer diameter of the protruding portion is smaller than a largest inner diameter of the tapered portion.

2. The seal device according to claim 1,
wherein an end surface of the protruding portion and an end surface of the cylindrical portion of the holder in a radial direction coincide with each other.

3. The seal device according to claim 1,
wherein a protrusion dimension of the protruding portion from the cylindrical portion of the holder is smaller than a thickness of the cylindrical portion.

4. The seal device according to claim 1,
wherein an end portion of the protruding portion, which faces the tapered portion, has a surface extending from the cylindrical portion of the holder substantially in a radial direction.

5. The seal device according to claim 1,
wherein an inclination angle of the tapered portion with respect to the shaft hole is 45 degrees or less.

6. The seal device according to claim 1, wherein an end surface of the protruding portion and an end surface of the cylindrical portion of the holder in a radial direction coincide with each other.

7. The seal device according to claim 1, wherein a protrusion dimension of the protruding portion from the cylindrical portion of the holder is smaller than a thickness of the cylindrical portion.

8. The seal device according to claim 1, wherein an end portion of the protruding portion, which faces the tapered portion, has a surface extending from the cylindrical portion of the holder substantially in a radial direction.

9. The seal device according to claim 1, wherein an inclination angle of the tapered portion with respect to the shaft hole is 45 degrees or less.

10. The seal device according to claim 2,
wherein a protrusion dimension of the protruding portion from the cylindrical portion of the holder is smaller than a thickness of the cylindrical portion.

11. The seal device according to claim 2, wherein an end portion of the protruding portion, which faces the tapered portion, has a surface extending from the cylindrical portion of the holder substantially in a radial direction.

12. The seal device according to claim 2,
wherein an inclination angle of the tapered portion with respect to the shaft hole is 45 degrees or less.

13. The seal device according to claim 3,
wherein an end portion of the protruding portion, which faces the tapered portion, has a surface extending from the cylindrical portion of the holder substantially in a radial vertical direction.

14. The seal device according to claim 3,
wherein an inclination angle of the tapered portion with respect to the shaft hole is 45 degrees or less.

15. The seal device according to claim 4,
wherein an inclination angle of the tapered portion with respect to the shaft hole is 45 degrees or less.

\* \* \* \* \*

UNITED STATES PATENT AND TRADEMARK OFFICE
CERTIFICATE OF CORRECTION

PATENT NO. : 11,384,840 B2
APPLICATION NO. : 16/975688
DATED : July 12, 2022
INVENTOR(S) : Arita It is certified that error appears in the above-identified patent and that said Letters Patent is hereby corrected as shown below:

In the Claims

Claim 13, Column 10, Line 63, "radial vertical direction" should be --radial direction--.

Signed and Sealed this
Eighth Day of October, 2024

Katherine Kelly Vidal
*Director of the United States Patent and Trademark Office*